US005201176A

United States Patent [19]

Oshima

[11] Patent Number: 5,201,176

[45] Date of Patent: Apr. 13, 1993

[54] HYDRAULIC CONTROL CIRCUIT AND HYDRAULIC CONTROL APPARATUS THEREFOR

[75] Inventor: Kazumi Oshima, Ageo, Japan

[73] Assignee: Kayaba Industry Co. Ltd., Tokyo, Japan

[21] Appl. No.: 829,892

[22] Filed: Feb. 4, 1992

[30] Foreign Application Priority Data

Feb. 7, 1991 [JP] Japan .................................... 3-38143
Feb. 7, 1991 [JP] Japan .................................... 3-38144
Feb. 7, 1991 [JP] Japan .................................... 3-38145

[51] Int. Cl.$^5$ ............................................ F16D 31/02
[52] U.S. Cl. ........................................ 60/422; 60/468; 60/494; 91/516; 91/532
[58] Field of Search ................. 60/422, 426, 368, 468, 60/494; 91/516, 532, 32, 33

[56] References Cited

U.S. PATENT DOCUMENTS 3,456,560 7/1969 Brannon ................................ 60/422
4,773,216 9/1988 Ohashi et al. ......................... 60/422

*Primary Examiner*—Edward K. Look
*Assistant Examiner*—F. Daniel Lopez
*Attorney, Agent, or Firm*—Morrison Law Firm

[57] ABSTRACT

A Hydraulic control circuit and a hydraulic control apparatus therefor are disclosed to preferentially feed fluid in a controlled amount or below to a first circuit system and feed fluid in an excessive amount exceeding the controlled amount to a second circuit system, and change over a pressure generated to a pilot pressure. Changing-over of control valves which are provided in the second circuit system permits a pilot pressure to be generated in the circuit. When any trouble occurs in the control valves, fluid fed to the second circuit system is unloaded, to thereby eliminate a possibility that an actuator is unexpectedly actuated.

5 Claims, 6 Drawing Sheets

HYDRAULIC CONTROL CIRCUIT AND HYDRAULIC CONTROL APPARATUS THEREFOR

BACKGROUND OF THE INVENTION

This invention relates to a hydraulic control circuit suitable for use for a vehicle such as a forklift truck or the like and a hydraulic control apparatus for such a hydraulic control circuit, and more particularly to a hydraulic control circuit for positively providing a stable pilot pressure and unloading fluid discharged from a pump to ensure safety of the hydraulic control circuit when any trouble such as non-operation of the circuit due to sticking of a spool of a control valve or the like occurs and a hydraulic control apparatus therefor.

Now, a prior art will be described with reference to FIG. 7 which exemplifies a hydraulic control circuit which has been conventionally used for a forklift truck. The hydraulic control circuit shown in FIG. 7 includes a pump P and a preference valve PV connected to the pump P. The preference valve PV is provided with a control flow port 101, which is connected to a first circuit system $S_1$. The first circuit system $S_1$ functions to control a cylinder for power steering. The preference valve PV is also provided with an excess flow port 103, which is connected to a second circuit system $S_2$. The second circuit system $S_2$ acts to control an actuator of an implement system. The preference valve PV is adapted to preferentially divert pressure oil in a predetermined or controlled amount or below to &he side of the control flow port 101 and feed pressure oil in an excessive amount exceeding the controlled amount to the second circuit system $S_2$.

The second circuit system $S_2$ includes a first control valve $V_1$ for controlling a lift cylinder, a second control valve $V_2$ for controlling a tilt cylinder and a third control valve $V_3$ for controlling an attachment cylinder which are arranged in order from an upstream side. The first, second and third control valves $V_1$, $V_2$ and $V_3$ include spool sections 105, 107 and 109, respectively. The spool sections 105, 107 and 109 are associated at both ends thereof with pilot chambers 111, 113 and 115, respectively, which are arranged so as to communicate through a pressure reducing valve 117 with the pump P. The pressure reducing valve 117 is adapted to determine a maximum value of a pilot pressure acting on each of the pilot chambers 111, 113 and 115.

The first control valve $V_1$, second control valve $V_2$ and third control valve $V_3$ also include proportional solenoids 119, 121 and 123, which function to control pilot pressures acting on the pilot chambers 111, 113 and 115 within a range up to the maximum pressure determined by the pressure reducing valve 117, respectively. Further, the first, second and third control valves $V_1$, $V_2$ and $V_3$ are provided with neutral ports 125, 127 and 129, respectively. When the first to third control valves $V_1$ to $V_3$ each are kept at a neutral position shown in FIG. 7, the neutral ports 125, 127 and 129 are open to cause operating or hydraulic oil fed through the excess flow port 103 to the second circuit system $S_2$ to be returned through a neutral flow passage 131 to a tank T.

The third control valve $V_3$ is provided on a downstream side thereof with a back pressure valve 133. The back pressure valve 133 is adapted to cause a pressure of a predetermined level to be produced in the neutral flow passage 131 when hydraulic oil flows through the neutral flow passage 131.

For example, when the first control valve $V_1$ is changed over to a change-over position indicated on a left side of FIG. 7 which is a lowered position of the first control valve $V_1$, a port on the side communicating with the actuator is caused to communicate with the tank T and the neutral port 125 is caused to be kept open, resulting in the lift cylinder lowering by gravity. This results in the excess flow port 103 communicating with the tank T; therefore, if the back pressure valve 133 is not arranged, the second circuit system $S_2$ fails to produce a sufficient pressure on the side of the excess flow port 103. In addition, if a load pressure is not generated on the side of the first circuit system $S_1$ under such conditions, the hydraulic control circuit fails to generate any circuit pressure. This fails to permit a pilot pressure for changing over the first control valve $V_1$ to be generated, resulting in a failure of changing-over of the first control valve $V_1$ or insufficient changing-over of the valve. The above-described arrangement of the back pressure valve 133 at the neutral flow passage 131 is to eliminate the disadvantage.

The first to third control valves $V_1$ to $V_3$ include inflow ports, respectively, which are arranged so as to communicate with each other through a parallel feeder 135, so that the control valves $V_1$ to $V_3$ are fed with hydraulic oil through the parallel feeder 135. To the parallel feeder 135 is connected an unload valve 137. The unload valve 137 includes a pressure chamber 139, which is arranged so as to communicate through a solenoid valve 141 with the neutral flow passage 131. The solenoid valve 141 is normally kept open to permit the pressure chamber 139 to communicate with the tank T. Thus, when a pressure of the pump acts on the parallel feeder 135, the unload valve 137 is caused to be open, so that pressure oil in the parallel feeder 135 may be returned to the tank T.

The solenoid valve 141 constructed as described above is closed when the proportional solenoids 119, 121 and 123 of the first, second and third control valves $V_1$, $V_2$ and $V_3$ are energized. More particularly, when the first to third control valves $V_1$ to $V_3$ each are to be changed over to a position other than the neutral position to actuate the actuator connected thereto, the solenoid valve 141 is changed over to a closed position to interrupt the communication between the pressure chamber 139 of the unload valve 137 and the tank T.

When the communication between the pressure chamber 139 of the unload valve 137 and the tank T is thus interrupted, the unload valve 137 is kept closed even if a pressure is generated in the parallel feeder 135. Therefore, pressure oil which has been fed to the parallel feeder 135 is caused to be fed to the first to third control valves $V_1$ to $V_3$.

Now, the manner of operation of the conventional hydraulic control circuit constructed as described above will be described hereinafter.

When the amount of fluid or hydraulic oil discharged from the pump P exceeds a predetermined level, hydraulic in an excessive amount exceeding the predetermined amount is fed to the second circuit system $S_2$. At this time, when the first to third control valves $V_1$ to $V_3$ each are at the neutral position shown in FIG. 1, hydraulic oil is returned through the neutral flow passage 131 and back pressure valve 133 to the tank T. Such flowing of hydraulic oil through the back pressure valve 133 causes a back pressure to be generated.

Therefore, when any one of the proportional solenoids 119 to 123 of the first to third control valves $V_1$ to $V_3$ is operated under the conditions that the back pressure has been thus generated, a pilot pressure corresponding to the amount of operation of the proportional solenoid acts on each of the pilot chambers 111 to 115 to change over each of the first to third control valves $V_1$ to $V_3$. When the proportional solenoids 119 to 123 of the first to third control solenoids $V_1$ to $V_3$ are operated, the solenoid valve 141 is concurrently energized, resulting in being changed over from the open position shown in FIG. 1 to the closed position. This causes the unload valve 141 to be closed.

When any emergency occurs while each of the actuators is being actuated, the proportional solenoid of the control valve which controls the actuator is de-energized, resulting in the solenoid valve 141 being also de-energized. This causes the solenoid valve 141 to be changed over to the open position to permit the pressure chamber 139 of the unload valve 137 to communicate with the tank T. When a pressure in the pressure chamber 139 reaches a tank pressure, the unload valve 137 is rendered open, so that hydraulic oil from the excess flow port 103 is returned through the parallel feeder 135 and unload valve 137 to the tank T. This prevents hydraulic oil from being fed to the actuator, to thereby stop actuation of the actuator.

The unload valve 137, when the first to third control valves $V_1$ to $V_3$ each are kept at the neutral position, exhibits an additional function of returning hydraulic oil which has flowed into the second circuit system $S_2$ to the tank T, to thereby prevent a temperature of hydraulic oil in the second circuit system $S_2$ from being increased.

Unfortunately, the conventional hydraulic control circuit constructed as described above causes a problem of often failing to generate a sufficient pilot pressure when the first to third control valves $V_1$ to $V_3$ each are changed over. For example, when the second control valve $V_2$ is changed over in order to forward tilt the tilt cylinder while the amount of fluid discharged from the pump P is kept reduced, the weight of a fork of a forklift truck causes a negative pressure to be generated in each of the neutral flow passage 131 and parallel feeder 135. This leads to insufficient generation of the pilot pressure, resulting in failing to ensure full stroke of the second control valve $V_2$.

The conventional hydraulic control circuit has another disadvantage. More particularly, when the proportional solenoid is suddenly operated and then stopped, a back pressure is instantaneously generated by the back pressure valve 133 to cause the actuator to be actuated a little. In this instance, when the neutral ports 125, 127 and 129 each fail to be completely closed at the time of sudden operation of the proportional solenoid, most of pressure oil is caused to be returned through the neutral flow passage 131 to the tank T, so that actuation of the actuator is interrupted.

SUMMARY OF THE INVENTION

The present invention has been made in view of the foregoing disadvantages of the prior art.

Accordingly, it is an object of the present invention to provide a hydraulic control circuit which is capable of permitting a stable pilot pressure to be positively generated.

It is another object of the present invention to provide a hydraulic control circuit which is capable of ensuring its safety when any trouble occurs in the hydraulic control circuit.

It is a further object of the present invention to provide a hydraulic control apparatus for a hydraulic control circuit which is capable of permitting a stable pilot pressure to be positively generated.

It is still another object of the present invention to provide a hydraulic control apparatus for a hydraulic control circuit which is capable of ensuring its safety when any trouble occurs in the hydraulic control apparatus.

In accordance with one aspect of the present invention, a hydraulic control circuit is provided. The hydraulic control circuit includes a preference valve connected to a pump and provided with a control flow port and an excess flow port, a first circuit system connected to the side of the control flow port of the preference valve, a second circuit system connected to the side of the excess flow port of the preference valve, a plurality of control valves each connected to the second circuit system for controlling an actuator and each provided with a pilot chamber on which a discharge pressure of the pump acts, proportional solenoids each arranged so as to control a pressure in each of the pilot chambers of the control valves, and a neutral passage through which hydraulic oil fed from the excess flow port is returned to a tank when each of the control valves is at a neutral position. The hydraulic control circuit further includes a solenoid valve arranged between the control flow port of the preference valve and the first circuit system so as to be in synchronism with the proportional solenoid valves, a change-over valve provided with an orifice and arranged in parallel with the solenoid valve and an unload valve connected to the side of the excess flow port of the preference valve, whereby the solenoid valve is rendered open when the control valves are at the neutral position, to thereby cause hydraulic oil introduced through the control flow port to be fed through the solenoid valve to the first circuit system, the solenoid valve is closed when the control valves are changed over to a position other than the neutral position, to thereby cause hydraulic oil introduced through the control flow port to be fed through the orifice of the change-over valve to the first circuit system, the unload valve is rendered open due to an action of the change-over valve when the solenoid valve is open, to thereby cause excessive hydraulic oil introduced through the excess flow port to be unloaded from the unload valve, and the unload valve is closed due to an action of the change-over valve when solenoid valve is closed.

In accordance with another aspect of the present invention, a hydraulic control apparatus for a hydraulic control circuit is provided. The hydraulic control apparatus includes a body formed with a port communicating a pump, a first circuit system including an actuator and a second circuit system provided with a plurality of control valves; a preference valve arranged at the body and provided with a control flow port and an excess flow port; the preference valve distributing to the first circuit system all of fluid discharged from the pump when the fluid is in a predetermined amount or below; the preference valve distributing fluid in the predetermined amount to the first circuit system and fluid in an excessive amount exceeding the predetermined amount to the second circuit system when the amount of fluid discharged from the pump exceeds the predetermined amount; a solenoid valve provided at the body and arranged between the control flow port of the preference valve and the actuator; the solenoid valve being operated in a manner to be open when the control valves of the second circuit system are kept at a neutral position and closed when the control valves are changed over to a position other than the neutral position; an unload valve including a pilot chamber and arranged so as to communicate with the excess flow port of the preference valve; the unload valve being operated depending upon a pressure in the pilot chamber; and a change-over valve arranged in the body so as to be in parallel with the solenoid valve; the change-over valve permitting the pilot chamber of the unload valve to communicate with a tank when the solenoid valve is open; the change-over valve permitting the flow control port of the preference valve to communicate with the actuator through an orifice and interrupting the communication between the pilot chamber of the unload valve and the tank when the solenoid valve is closed.

In a preferred embodiment of the present invention, the change-over valve comprises a sleeve and a spool slidably arranged in the sleeve; the sleeve and spool each being formed with an orifice communicating with the control flow port of the preference valve; the change-over valve selectively carrying out the communication between the pilot chamber of the unload valve and the tank and interruption of the communication depending upon a position of movement of the spool.

In a preferred embodiment of the present invention, the unload valve is arranged in the body. Alternatively, the unload valve may be arranged separate from the body.

In the present invention constructed as described above, when the control valves of the second circuit system are at the neutral position, the solenoid valve is caused to be open. This results in hydraulic oil from the control flow port being fed through the solenoid valve to the first circuit system. On the contrary, when the control valves of the second circuit system are changed over to a position other than the neutral position, the solenoid valve is closed. This causes hydraulic oil from the control flow port to be fed through the orifice of the change-over to the first circuit system. More particularly, when the control valves of the second circuit system are thus changed over, hydraulic oil is fed through the orifice of the change-over valve to the first circuit system and a differential pressure is generated through the orifice. A pressure on an upstream of the orifice acts as a pilot pressure of each of the control valves of the second circuit system. Also, when the solenoid valve is closed, the change-over valve is changed over to interrupt the communication between the pilot chamber of the unload valve and the tank. This results in the unload valve being kept closed.

When the operation of the hydraulic control circuit is failed while keeping the second circuit system changed over, the proportional solenoids are actuated so as to return the control valves to the neutral position. Even when the actuation of the proportional solenoids fails to return the control valves to the neutral position, the solenoid valve is changed over to the open position in synchronism with the proportional solenoids. This permits the unload valve to be kept open, so that hydraulic oil fed through the excess flow port to the second circuit system is unloaded through the unload valve. Thus, the hydraulic control circuit positively prevents actuation of the actuator connected to each of the control valves even when the control valves are caused to stick or be inoperative.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, wherein.

DETAILED DESCRIPTION OF THE PREFERRED EMBODIMENTS

Figure 1:
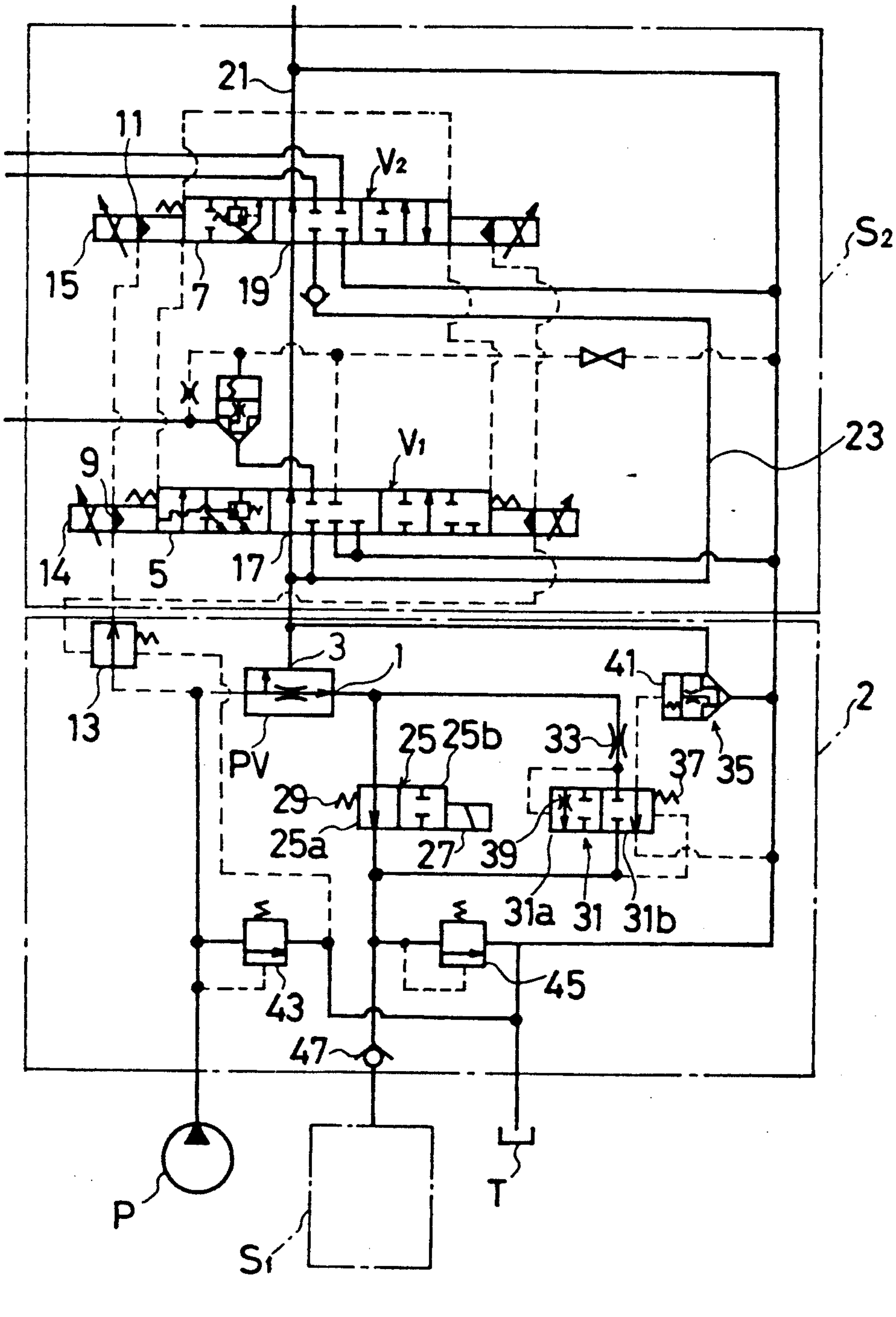
FIG. 1 is a circuit diagram showing an embodiment of a hydraulic control circuit according to the present invention.

Now, the present invention will be described hereinafter with reference to FIGS. 1 to 6.

Referring first to FIGS. 1 to 5 showing a first embodiment of a hydraulic control circuit according to the present invention, a hydraulic control circuit of the illustrated embodiment includes a pump P and a preference valve PV connected to the pump P. The preference valve PV is provided with a control flow port 1, which is connected to a first circuit system $S_1$. The first circuit system $S_1$ functions to control a cylinder for power steering. The preference valve PV is also provided with an excess flow port 3, which is connected to a second circuit system $S_2$. The second circuit system $S_2$ serves to control an actuator of an implement system. The preference valve PV is adapted to preferentially distribute the flow of fluid in a predetermined or controlled amount toward the side of the control flow port 1 and distribute the flow of fluid in an excessive amount exceeding the controlled amount to the second circuit system $S_2$.

The above-described second circuit system $S_2$ includes a first control valve $V_1$ and a second control valve $V_2$ which are arranged in order from an upstream side of the system $S_2$. The first control valve $V_1$ is provided with a spool section 5, of which both ends are associated with a pilot chamber 9 and likewise the second control valve $V_2$ is provided with a spool section 7 of which both ends are associated with a pilot chamber 11. Both pilot chambers 9 and 11 are arranged so as to communicate through a pressure reducing valve 13 with the pump P. Such construction permits a maximum value of a pilot pressure acting on each of the pilot chambers 9 and 11 to be controlled through the pressure reducing valve 13. Also, the fist and second control valves $V_1$ and $V_2$ are provided with proportional solenoids 14 and 15 which are adapted to function to control pressures in the pilot chambers 9 and 11, respectively.

In addition, the first and second control valves $V_1$ and $V_2$ are provided with neutral ports 17 and 18, respectively, which are rendered open when the first and second control valves $V_1$ and $V_2$ each are held at a neutral position shown in FIG. 1, to thereby cause pressure oil fed through the excess flow port 3 thereto to be returned through a neutral flow passage 21 to the tank T. Also, the first and second control valves $V_1$ and $V_2$ are provided with inflow ports, respectively, which are arranged so as to communicate with a parallel feeder 23.

The hydraulic control circuit of the illustrated embodiment also includes a solenoid valve 25 interposedly arranged between the control flow port 1 of the preference valve PV and the first circuit system $S_1$. The solenoid valve 25 is adapted to be operated between an open position 25*a* and a closed position 25*b*. More particularly, the solenoid valve 25 is changed over to the open position 25*a* by a coiled spring 29 when a solenoid 27 is not energized, whereas it is changed over to the closed position 25*b* when the solenoid 27 is energized. The solenoid 27 is energized and de-energized in synchronism with energization and de-energization of the proportional solenoids 14 and 15 of the first and second control valves $V_1$ and $V_2$.

The hydraulic control circuit of the illustrated embodiment further includes a change-over valve 31 connected in parallel to the solenoid valve 25. The change-over valve 31 is formed with an orifice 33 on a primary side thereof. The preference valve PV is provided with an unload valve 35 on the side of the excess flow port 3. The unload valve 35 is kept open when a pilot chamber 41 of the valve 35 is caused to communicate with the tank T to drain fluid fed to the side of the excess flow port 3. When the communication between the pilot chamber 41 of the unload valve 35 and the tank T is interrupted, the unload valve 35 is then kept closed.

The change-over valve 31 is adapted to be changed over between two positions 31*a* and 31*b*. More particularly, it is suitably changed over between the positions 31*a* and 31*b* depending upon an operative relationship between a pilot pressure applied from each of primary and secondary sides thereof and a coiled spring 37. When the change-over valve 31 is at the change-over position 31*a*, fluid in the controlled amount fed from the preference valve PV is permitted to flow, resulting in being fed to the first circuit system $S_1$. At this time, an orifice 39 provided at the change-over position 31*a* exhibits an orifice action, to thereby generate a differential pressure in cooperation with an restriction action of the above-described orifice 33. Also, the unload valve 35 is closed because the communication between the pilot chamber 41 of the unload valve 35 and the tank T is interrupted.

Then, when the change-over valve 31 is changed over to the position 31*b*, it is closed and the communication between the pilot chamber 41 of the unload valve 35 and the tank T is attained, resulting in the unload valve 35 being open. In the drawings, reference numerals 43 and 45 each designate a relief valve, and 47 is a check-off valve.

Now, a hydraulic control apparatus generally designated by reference numeral 2 in FIG. 1 will be detailedly described hereinafter with reference to FIG. 2 as well as FIG. 1.

The hydraulic control apparatus includes a body 51, in which the above-described preference valve PV, solenoid valve 25, change-over valve 31, orifice 33, pressure reducing valve 13, relief valves 43 and 45, and check valve 47 are incorporated. In the illustrated embodiment, the unload valve 35 is provided separate from the body 51. Alternatively, it may be arranged in the body. The body 51 is formed with a pump port $P_p$ communicating with the pump P, a port $P_F$ communicating with the first circuit system $S_1$, the excess flow port 3 communicating with the second circuit system $S_2$, a port $P_A$ communicating with the unload valve 35 and the like.

Figure 2:
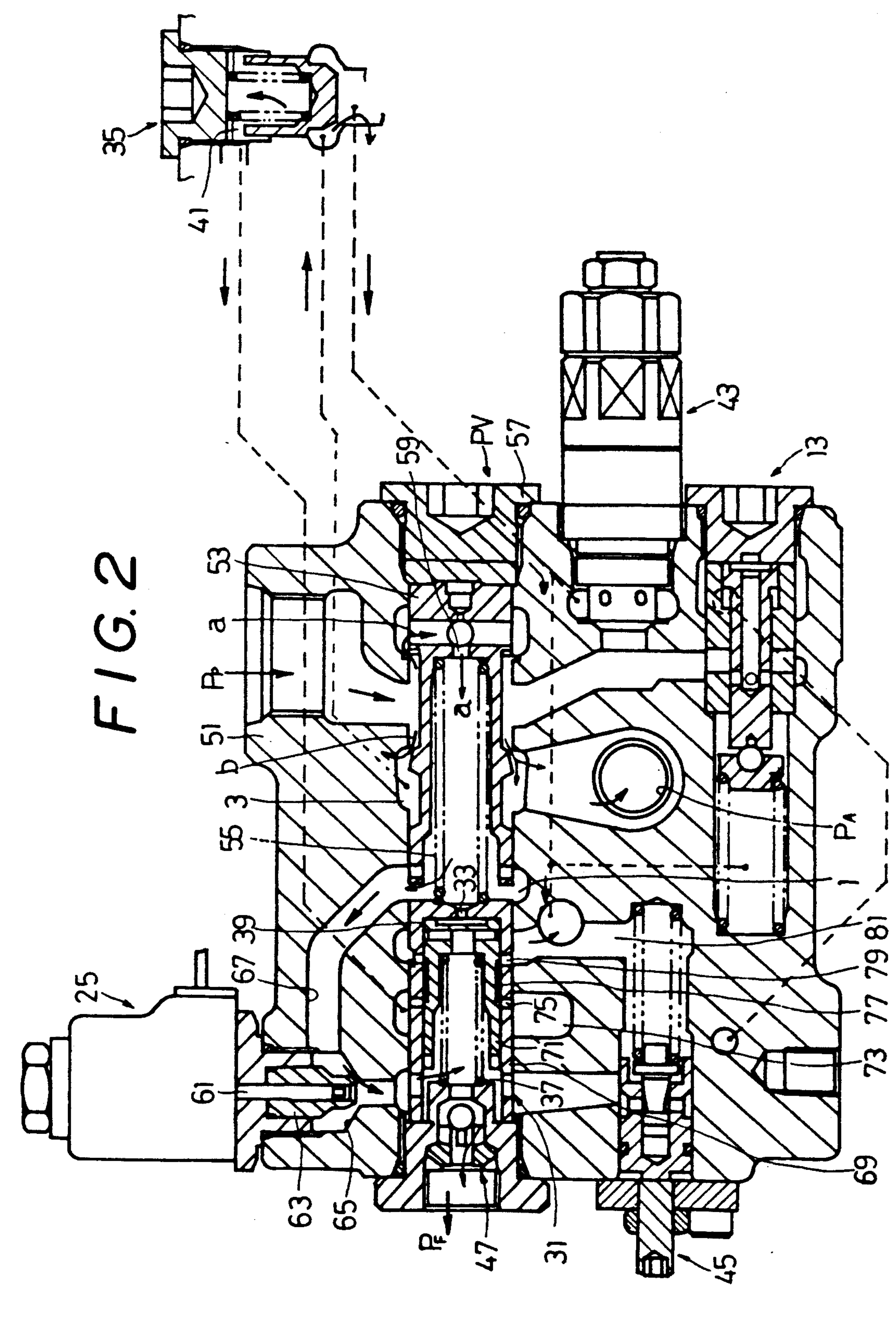
FIG. 2 is a vertical sectional view showing a hydraulic control apparatus incorporated in the hydraulic control circuit shown in FIG. 1 in which a solenoid valve is kept open.

The preference valve PV includes a spool 53, a coiled spring 55, an end plug 57 and the like, and the coiled spring 55 forces the spool 53 in the right direction in FIG. 2. The spool 53 is adapted to move against the coiled spring 55 depending upon the amount of fluid discharged from the pump P, to thereby preferentially distribute the flow of fluid in a predetermined amount discharged from the pump toward the side of the control flow port 1 and distribute the flow of fluid of the pump in an excessive amount exceeding the predetermined amount toward the side of the excess flow port 3. Thus, when hydraulic oil fed from the pump P through the pump port $P_P$ is in the predetermined amount or less, the hydraulic oil is fed through an orifice 59 only to the first circuit system $S_1$ as indicated at an arrow a in FIG. 2. When the amount of flow of fluid fed exceeds the predetermined amount, the spool 53 is moved in the left direction in FIG. 2 against the coiled spring 55 to permit the excess flow port 3 to communicate with the pump, so that the excessive fluid is fed to the second circuit system $S_2$ as indicated at an arrow b in FIG. 2. The solenoid valve 25 includes a push rod 61, which is fixedly mounted thereon with a valve body 63 adapted to be selectively seated on a seat 65. The push rod 61 is adapted to be moved in a vertical direction in FIG. 2 due to energization and de-energization of the solenoid 27, so that the valve body 63 may be selectively seated on the seat 65, to thereby operate the solenoid valve 25. Hydraulic oil fed from the preference valve PV is then guided from the control flow port 1 through a flow passage 67 to the solenoid valve 25.

Figure 3:
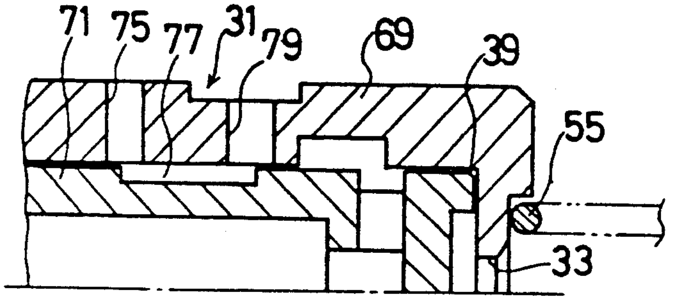
FIG. 3 is a fragmentary sectional view showing a part of the hydraulic control apparatus shown in FIG. 2.
Figure 5:
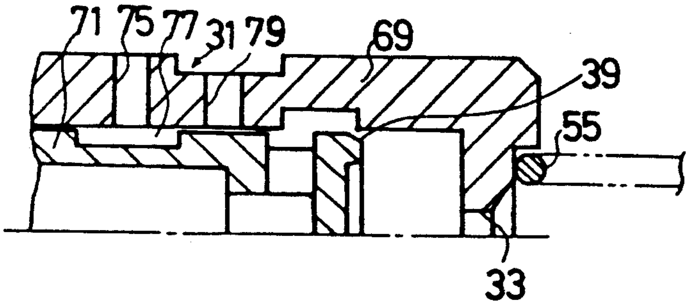
FIG. 5 is a fragmentary sectional view showing a part of the hydraulic control apparatus shown in FIG. 4.
Figure 4:
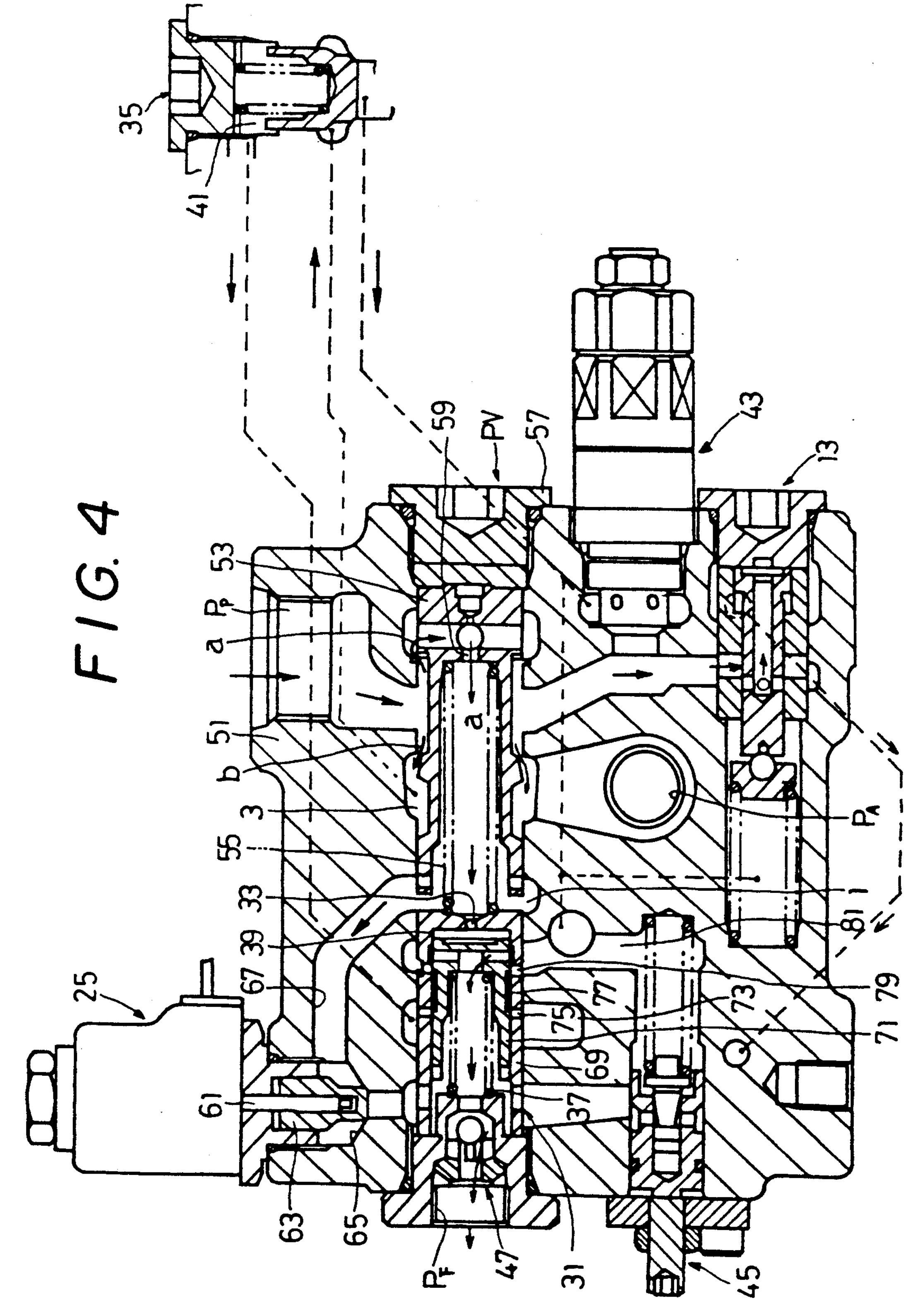
FIG. 4 is a vertical sectional view of the hydraulic control apparatus shown in FIG. 2 in which a solenoid valve is kept closed.

The change-over valve 31 is constituted by a sleeve 69, a spool 71 arranged in the sleeve 69 in a manner to be movable in a lateral or transverse direction in FIG. 2, the above-described coiled spring 37 for forcing the spool in the right direction in FIG. 2, and the like. The orifice 33 is formed at the sleeve 69 and the orifice 39 is formed by a gap defined between the sleeve 69 and the spool 71. When the solenoid valve 25 is de-energized, resulting in being kept open as shown in FIG. 2, hydraulic oil flowing into the control flow port 1 is then permitted to flow though the solenoid valve 25 of small resistance to the port $P_F$. This substantially prevents a pressure from acting on the spool 71 of the change-over valve 31, so that the change-over valve 31 is kept at the position 31*b* as shown in FIGS. 2 and 3. When the change-over valve 31 is at the position shown in FIGS. 2 and 3, the pilot chamber 41 of the unload valve 35 is permitted to communicate through a flow passage 73, a communication aperture 75, a flow passage 77, a communication aperture 79 and a flow passage 81 with the tank T.

When the solenoid valve 25 is energized, to thereby be closed, flowing of fluid through the flow passage 67 is interrupted to cause all hydraulic oil flowing into the control flow port 1 to flow through the orifices 33 and 39. This causes a pressure difference to be generated through the orifice 39 and the spool 71 to be moved to a position shown in FIG. 4 and 5 due to the pressure difference. This is the change-over position 31*a*. The spool 71 is moved in the left direction in FIG. 2 against the coiled spring 37, resulting in a flow path formed by a flow passage 73, a communication aperture 75, a flow passage 77, a communication aperture 79 and a flow passage 81 being interrupted.

Now, the manner of operation of the hydraulic control circuit of the illustrated embodiment described above will be described hereinafter.

First, the operation will be described supposing that no external electric signal is input to the hydraulic control circuit and the proportional solenoids 14 and 15 of the first control valve $V_1$ and second control valve $V_2$ are kept de-energized.

When the proportional solenoids 14 and 15 are kept de-energized, the solenoid valve 25 synchronized with the proportional solenoids is kept de-energized, resulting in being kept open. Therefore, the change-over valve 31 causes the pilot chamber 41 of the unload valve 35 to communicate with the tank while being closed. Under such conditions, hydraulic oil flowing from the pump P into the circuit is diverted by the preference valve PV, so that hydraulic oil in an excessive amount above the predetermined or controlled amount is fed through the excess flow port 3 to the second circuit system $S_2$. Hydraulic oil in the controlled amount or below is fed through the control flow port 1 to both solenoid valve 25 and change-over valve 31 in parallel and then fed to the check valve 47 to the first circuit system $S_1$. The change-over valve 31 is at the change-over position 31*b*, so that the pilot chamber 41 of the unload valve 35 is permitted to communicate through the flow passage 73, communication aperture 75, flow passage 77, communication aperture 79 and flow passage 81 with the tank T, so that the unload valve 35 is rendered open. Once the unload valve 35 is thus open, the excessive hydraulic oil fed to the second circuit system $S_2$ is returned through the neutral ports 17 and 19 to the tank T and also returned through the unload valve 35 to the tank T.

Then, when an external electrical signal is input to the hydraulic control circuit to energize the proportional solenoids 14 and 15 of the first and second control valves $V_1$ and $V_2$, the solenoid 27 of the solenoid valve 25 is concurrently energized to cause the solenoid valve 25 to be changed over to the closed position 25*b*. More particularly, the push rod 61 and valve body 63 of the solenoid valve 25 are downward moved in FIG. 2, so that the valve body 63 is seated on the valve seat 65. This causes hydraulic oil in the controlled amount or below which has flowed into the control flow port 1 to be guided toward only the change-over valve 31, resulting in being fed to the first circuit system $S_1$.

The change-over valve 31 is changed over to the position 31*a* to interrupt a flow path constituted by the flow passage 73, communication aperture 75, flow passage 77, communication aperture 79 and flow passage 81 which flow path permits the pressure chamber 41 of the unload valve 35 to communicate with the tank T, so that the unload valve 35 is closed. A pressure on the side of the pump P at this time comprises the sum of a load pressure on the side of the first circuit system $S_1$, a differential pressure between the orifices 33 and 39, and a control pressure of the preference valve PV.

Now, a pilot pressure acting on each of the first and second control valves $V_1$ and $V_2$ under such conditions as described above will be described hereinafter. As described above, at least a part of hydraulic oil in the controlled amount or below is fed through the orifice 33 and the orifice 39 of the change-over valve 31 toward the first circuit system $S_1$. At this time, a sufficient differential pressure is produced due to an action of the orifices 33 and 39, so that a pilot pressure required is positively provided.

Now, the manner of operation of the hydraulic control circuit in an emergency will be described.

It is supposed that the spools of the first and second control valves $V_1$ and $V_2$ generate a trouble such as sticking, to thereby fail to return to the neutral position, under the conditions that any one of the first and second control valves $V_1$ and $V_2$ is changed over. In order to eliminate the trouble, the feeding of an excitation current to the proportional solenoid of each of the control valves is first interrupted. This causes the solenoid 27 of the solenoid valve 25 to be de-energized, so that the solenoid valve 25 may be returned to the open position. Such changing-over of the solenoid valve 25 to the open position causes the change-over valve 31 to be correspondingly changed over to the position 31*b*, resulting in permitting the pilot chamber 41 of the unload valve 35 to communicate with the tank T. Thus, hydraulic oil which has been fed to the second circuit system $S_2$ is unloaded through the unload valve 35, so that a possibility that the actuator connected to each of the first and second control valves $V_1$ and $V_2$ is suddenly actuated may be positively eliminated.

Figure 6:
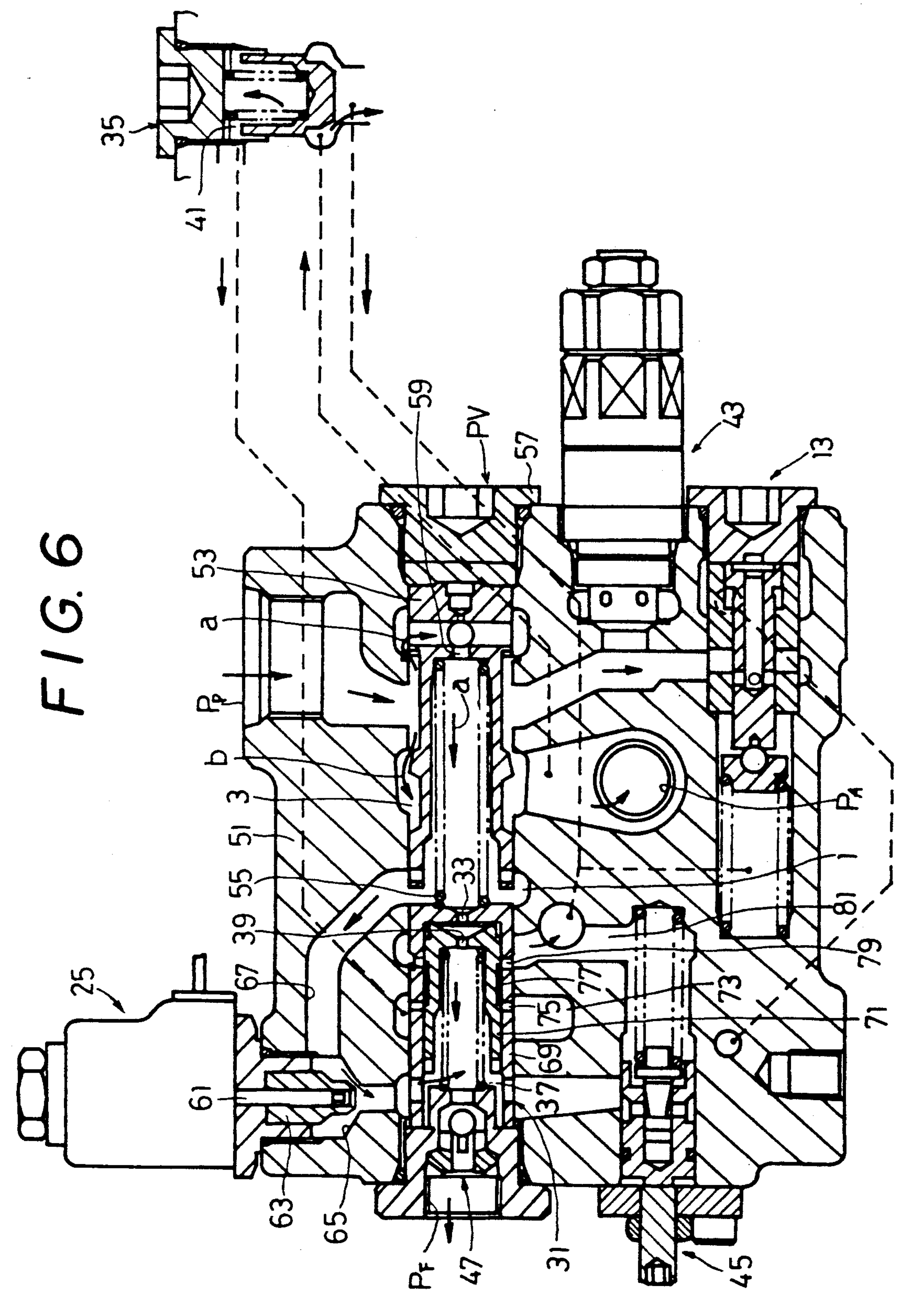
FIG. 6 is a vertical sectional view showing a hydraulic control apparatus incorporated in another embodiment of a hydraulic control circuit according to the present invention.
Figure 7:
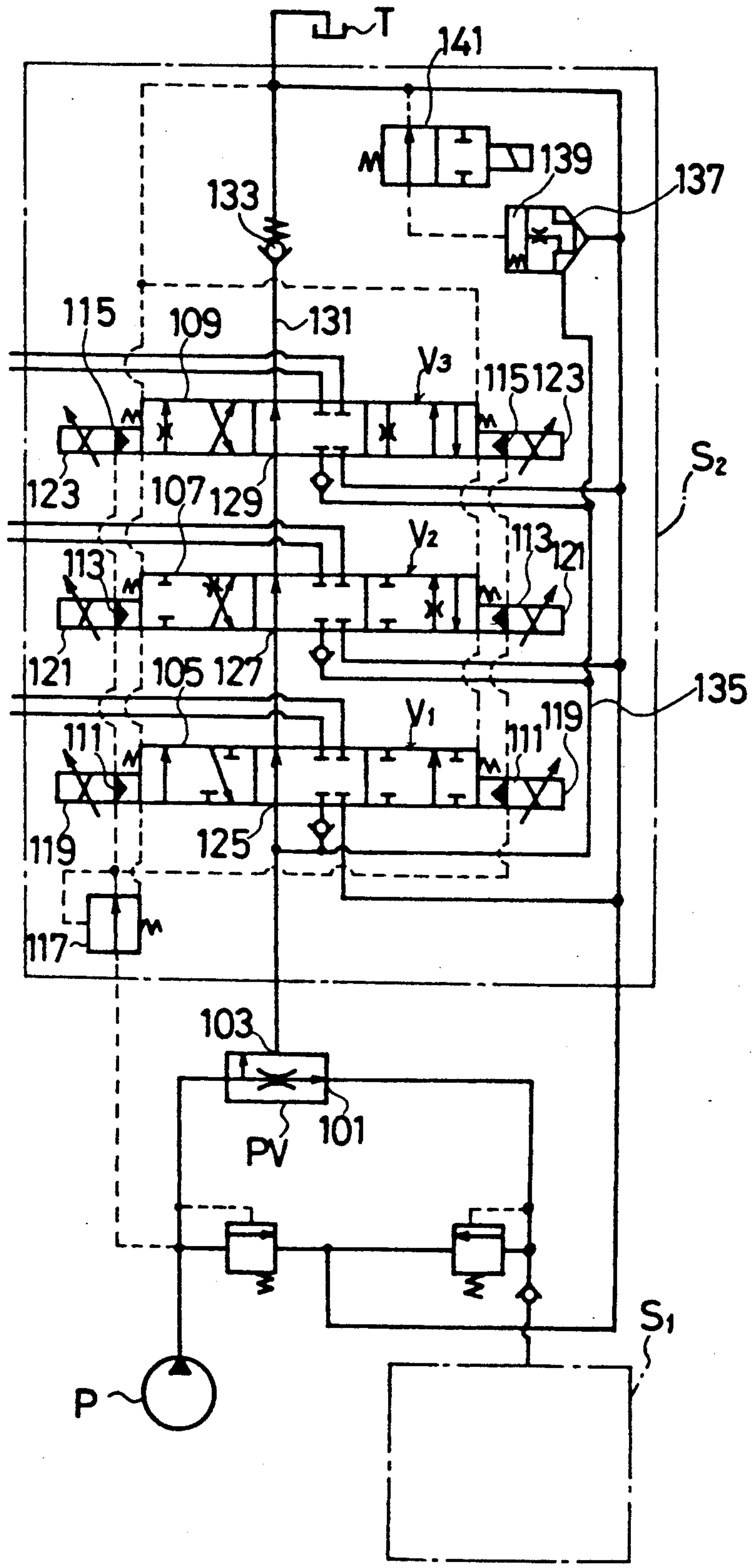
FIG. 7 PRIOR ART
FIG. 7 is a circuit diagram showing a conventional hydraulic control circuit.

Referring now to FIG. 6 showing a second embodiment of a hydraulic control circuit according to the present invention, a hydraulic control circuit of the illustrated embodiment is constructed in such a manner that an orifice 39 of a change-over valve 31 is formed directly at a spool. The remaining part of the second embodiment may be constructed in substantially the same way as the first embodiment described above. Thus, it will be noted that the second embodiment effectively exhibits the same function as the first embodiment.

The embodiments described above each are so constructed that the orifices 33 and 39 are arranged in series. Such construction permits a spring constant of the coiled spring 37 acting on the spool 71 to be reduced.

While preferred embodiment of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A hydraulic control circuit comprising:

a preference valve connected to a pump and provided with a control flow port and an excess flow port;

a first circuit system connected to the side of the control flow port of the preference valve;

a second circuit system connected to the side of the excess flow port of the preference valve;

a plurality of control valves each connected to the second circuit system for controlling an actuator and each provided with a pilot chamber on which a discharge pressure of the pump acts;

proportional solenoids each arranged so as to control a pressure in each of the pilot chambers of the control valves;

a neutral passage through which hydraulic oil fed from the excess flow port is returned to a tank when each of the control valves is at a neutral position;

a solenoid valve arranged between the control flow port of the preference valve and the first circuit system so as to be in synchronism with the proportional solenoid valves;

a change-over valve provided with an orifice and arranged in parallel with the solenoid valve; and an unload valve connected to the side of the excess flow port of the preference valve;

whereby the solenoid valve is rendered open when the control valves are at the neutral position, to thereby cause hydraulic oil introduced through the control flow port to be fed through the solenoid valve to the first circuit system;

the solenoid valve is closed when the control valves are changed over to a position other than the neutral position, to thereby cause hydraulic oil introduced through the control flow port to be fed through the orifice of the change-over valve to the first circuit system;

the unload valve is rendered open due to an action of the change-over valve when the solenoid valve is open, to thereby cause excessive hydraulic oil introduced through the excess flow port to be unloaded; and the unload valve is closed due to an action of the change-over valve when solenoid valve is closed.

2. A hydraulic control apparatus for a hydraulic control circuit comprising:

a body formed with a port communicating a pump, a first circuit system including an actuator and a second circuit system provided with a plurality of control valves;

a preference valve arranged at the body and provided with a control flow port and an excess flow port;

the preference valve distributing to the first circuit system all of fluid discharged from the pump when the fluid is in a predetermined amount or below;

the preference valve distributing fluid in the predetermined amount to the first circuit system and fluid in an excessive amount exceeding the predetermined amount to the second circuit system when the amount of fluid discharged from the pump exceeds the predetermined amount;

a solenoid valve provided at the body and arranged between the control flow port of the preference valve and the actuator;

the solenoid valve being operated in a manner to be open when the control valves of the second circuit system are kept at a neutral position and closed when the control valves are changed over to a position other than the neutral position;

an unload valve including a pilot chamber and arranged so as to communicate with the excess flow port of the preference valve;

the unload valve being operated depending upon a pressure in the pilot chamber; and a change-over valve arranged in the body so as to be in parallel with the solenoid valve;

the change-over valve permitting the pilot chamber of the unload valve to communicate with a tank when the solenoid valve is open;

the change-over valve permitting the flow control port of the preference valve to communicate with the actuator through an orifice and interrupting the communication between the pilot chamber of the unload valve and the tank when the solenoid valve is closed.

3. A hydraulic control apparatus as defined in claim 2, wherein the change-over valve comprises a sleeve and a spool slidably arranged in the sleeve;

the sleeve and spool each being formed with an orifice communicating with the control flow port of the preference valve;

the change-over valve selectively carrying out the communication between the pilot chamber of the unload valve and the tank and interruption of the communication depending upon a position of movement of the spool.

4. A hydraulic control apparatus as defined in claim 2, wherein the unload valve is arranged in the body.

5. A hydraulic control apparatus as defined in claim 2, wherein the unload valve is arranged separate from the body.

* * * * *